Oct. 11, 1949.  R. C. HOPGOOD  2,484,092
REMOTE CONTROL ADAPTER
Filed Sept. 16, 1947  2 Sheets-Sheet 1
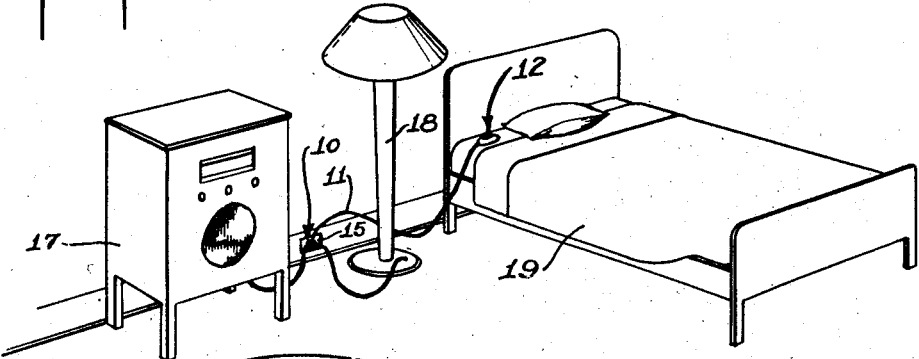
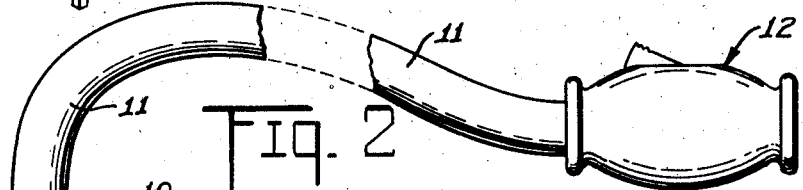
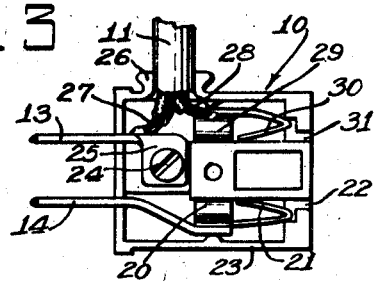
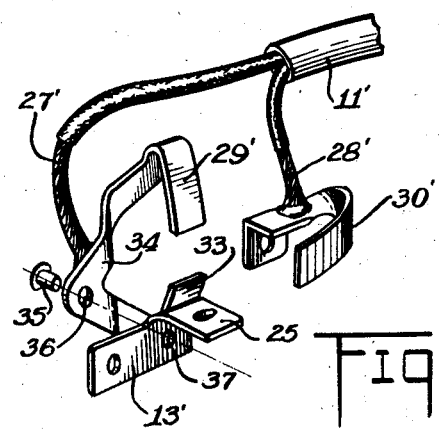
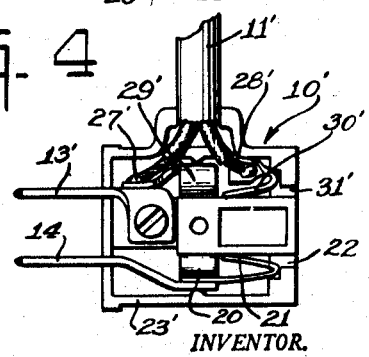
INVENTOR.
Roy C Hopgood

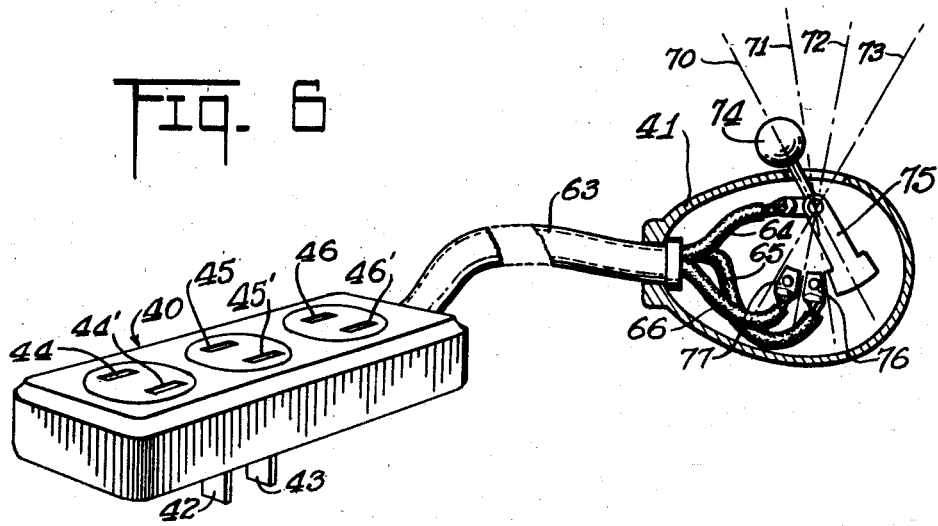
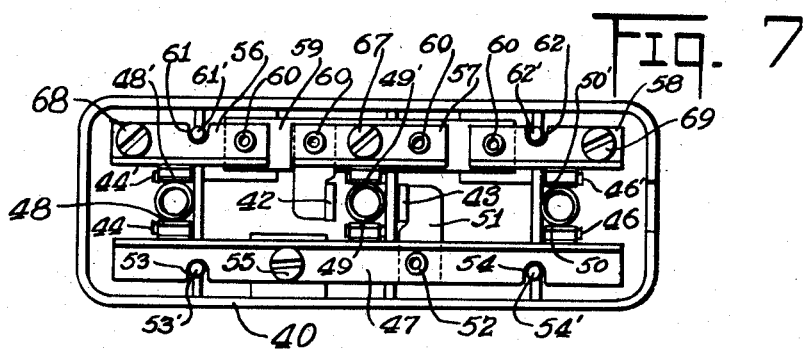
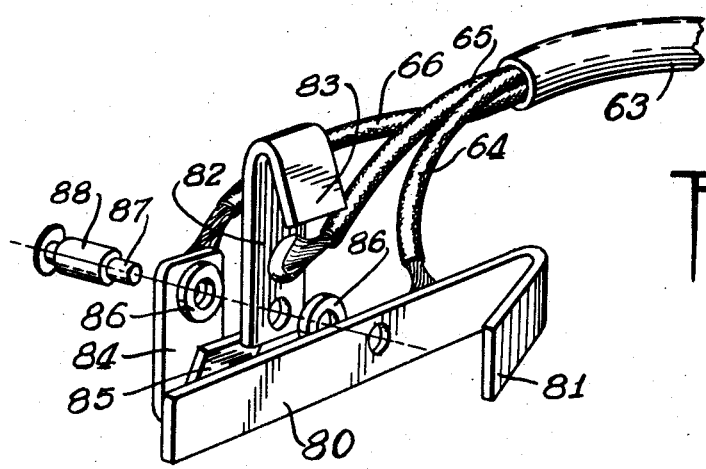

Patented Oct. 11, 1949

2,484,092

UNITED STATES PATENT OFFICE 2,484,092

REMOTE-CONTROL ADAPTER

Roy C. Hopgood, Glen Ridge, N. J.

Application September 16, 1947, Serial No. 774,364

7 Claims. (Cl. 171—97)

My invention relates to an improved electrical adapter and in particular to remote-control means for such an adapter.

It is an object of my invention to provide an improved device of the character indicated.

It is another object to provide an improved multiple-outlet electrical adapter wherein one of the circuits of said adapter may be remotely controlled.

It is a further object to provide an improved multiple-outlet electrical adapter wherein a plurality of the circuits of said adapter may be remotely controlled.

It is a still further object to provide improved remote electrical switching means.

It is in general an object of the invention to provide an improved electrical switching means that may be readily adapted to the selective or concurrent control of a variety of electrical appliances from a remote location.

Other objects and various further features of the invention will be pointed out or will occur to those skilled in the art from a reading of the following specification in conjunction with the accompanying drawings. In the drawings, which show, for illustrative purposes only, preferred forms of the invention:

Fig. 1 is a perspective view of a plurality of electrical appliances connected for remote control by means of an arrangement incorporating features of the invention;

Fig. 2 is an enlarged view, partially in perspective, showing the remote-control adapter of Fig. 1;

Fig. 3 is a fragmentary view of the adapter of Fig. 2, with part of the housing removed to indicate an internal arrangement of parts;

Fig. 4 is a view similar to Fig. 3, but showing a modified internal arrangement of parts;

Fig. 5 is an exploded view in perspective showing parts of the arrangement of Fig. 4;

Fig. 6 is a view partially in perspective and partially in section of another embodiment of the invention;

Fig. 7 is a fragmentary view of the adapter of Fig. 6, with the bottom cover removed to indicate an internal arrangement of parts; and Fig. 8 is an exploded view in perspective of a modification of the adapter of Fig. 7.

Briefly stated, my invention contemplates a remote-control adapter incorporating an adapter unit, a remote switch, and a flexible multiple-conductor cable or cord between the unit and the switch for selective control of a device or devices connected to said adapter unit. In the forms to be described, the cable or cord includes conductors which, by means of the switch, may be caused to complete one or a plurality of the circuits in a multiple-outlet adapter. In other forms, the switch may independently or simultaneously complete a plurality of the circuits in the adapter.

In a particularly useful application of my invention, bedside appliances such as a radio and a lamp may be plugged into my adapter, for remote control from a bed. In such circumstances, the light sleeper may control his electric appliances with little or no disturbance of the peaceful drowsiness which he desires. If he should doze and later sense that his radio has been left on, he has only to press the remote switch, since no reaching for the radio is necessary.

Referring to Figs. 1 to 5 of the drawings, my invention is shown in application to a remote-control adapter comprising an adapter unit 10, a flexible conducting cable 11, and a remote switch 12. The adapter unit may include power-inlet means in the form of a plug having two prongs or projections 13—14 to fit in a suitable outlet, such as the baseboard outlet 15. The adapter 10 may include a plurality of outlets in the form of sockets 16; and a corresponding plurality of electrical appliances, such as a radio 17 and a floor lamp 18, may be plugged into the sockets 16 of the adapter 10.

In accordance with the invention, one or more of the internal circuits of the adapter 10 includes the conductors of the cable or cord 11 and may be completed and broken only by operation of the remote switch 12. In the form shown in Fig. 3, all circuits within the adapter 10 may be controlled by the single switch 12. Thus, in the arrangement of Fig. 1 and with the adapter of Fig. 3, a person lying in the bed 19 has only to operate the switch 12 to turn on or to turn off both the lamp 18 and the radio 17, as may be desired. Of course, the selective switching of the appliances 17—18 may be varied also by the switches incorporated in the appliances themselves.

Referring further to Fig. 3, the internal structure of the adapter 10 may be seen to comprise a first conducting means of conventional construction. This first conducting means includes the projecting prong 14 and a plurality of socket contact parts in the form of conducting fingers 20—21, positioned to be contacted and resiliently to wipe the prongs of the various appliance plugs that may be inserted into the opening 22 aligned with the finger 21. If desired, fingers 20—21 may be formed unitarily with the prong 14, as by soldering or riveting these parts together. It will be understood that suitable recesses, lugs, notches, and the like may be formed in the adapter housing 23 so as to obviate the need for special securing means to hold the conducting members 14—20—21 in place.

In many respects the other side of the circuits of the adapter 10 may be generally similar to the side described as being fed by prong 14. The second inlet element or prong 13 may be securely mounted in the housing 23, as by means of a screw 24 driven into the housing 23 through an upturned portion or lug 25 in the prong 13. The cable 11 may snugly fit and enter the housing 23 through a suitably formed neck 26, and one of the conductors 27 may be secured as by solder to the prong member 12. The other of the conductors of cable 11, namely, conductor 28, may be similarly secured to a cluster of contact fingers 29—30, which may be paired off with the fingers 20—21 and positioned opposite socket openings, such as the opening 31. It will be clear that for an appliance plug inserted through socket openings 22—31 contact will be made with fingers 21—30 and that the circuit to such appliance will be completed or not depending upon the operation of switch 12. The same is true for a plug inserted in socket 16 so as to make contact with fingers 20—29, for this circuit to the appliance will also be controlled by the switch 12.

In the modification of Figs. 4 and 5, the switch 12 is arranged to control an appliance plugged into only one of the outlet faces of the adapter 10'. According to this modification, the inlet prong 14 may be exactly the same as that described for Fig. 3, in that it may be unitarily formed with all the socket fingers 20—21, to provide one side of the line to all the outlet faces of the adapter. The other power-inlet prong 13' differs, however, in that it is electrically connected to a plurality of contact fingers, such as the fingers 29' and 33. One of the conductors 27' of cable 11' may be electrically connected as by solder to the prong 13'; the other conductor 28' of cable 11' may be connected, also by solder, to the remaining contact finger 30'. It will be clear that for the arrangement described only the appliance plugged in through the socket holes 22—31' will be controlled by operation of the switch 12, for an appliance plugged into, say, the contact fingers 20—29' will be unaffected by operation of the switch 12. The arrangement of Figs. 4 and 5 may thus be useful, say, when it is desired to run an electric clock continuously, and to operate, say, a radio or a lamp from a remote location.

In a preferred form, the contact fingers 29'—33, providing the adapter circuits which are not subject to control by switch 12, are formed unitarily from the same stamping of conducting material. In Fig. 5, this stamping 34 is shown soldered to the conductor 27' of cable 11'. The prong 13' may be formed in a separate stamping to include a supporting lug 25', and both pieces 13'—34 may be joined, as by a transversely extending rivet 35, passing through holes 36 and 37 in members 34—13', respectively.

In the embodiment of Figs. 6 and 7 I show how a multiple-outlet adapter unit 40 may be remotely controlled, as by operation of a switch 41, so that a plurality of the circuits in the adapter 40 may be independently selectively operated or two circuits may be simultaneously operated. The adapter 40 of Fig. 6 may be generally similar to the adapter 10 of the previously described form, in that it may include a single power-inlet means such as prongs 42—43, and a plurality of power-outlet means accessible through the socket openings 44—44', 45—45', 46—46'. In the form shown, all three power outlets face to a single side of the adapter 40.

Internally, the adapter 40 may employ first conducting means in the form of a bus bar to apply one side of the power-inlet connection to one side of each of the power outlets. For this purpose, contact fingers 48—49—50 may be riveted, welded or otherwise permanently secured to the bus bar 47, in line with the outlet socket openings 44—45—46 for all the power outlets. In the form shown, the inlet prong 43 is formed at the end of a bracket 51 held as by a rivet 52 to the bus bar 47. For alignment purposes, the bus bar 47 may be recessed, as at 53—54, so as to rest against projections 53'—54' formed in the housing for the adapter 40. A self-tapping screw 55 may serve permanently to anchor the bus bar, with its contact fingers and the inlet prong 43 within the housing of the adapter 40, as will be clear.

To provide connections to the other side of the line, the adapter 40 may include another assembly similar to the assembly of bus bar 47 with the exception that each of the outlet contact fingers 48'—49'—50' is electrically insulated from the other. In the form shown, this insulation is accomplished by riveting three bus-bar supports 56—57—58 (supporting fingers 48'—49'—50', respectively) to a fiber strip 59 as by means of the rivets 60. Again the outer bus bar members 56—58 may be recessed, as at 61'—62' in the housing of adapter 40.

As distinguished from previously described combinations, the connecting cord 63 for the assembly of Fig. 6 preferably includes three conductors 64—65—66. One of these conductors 64 may be connected to the central bus bar 57, as by means of the screw 67, and the other two conductors 65—66 may be connected to the remaining bus bars 48'—50', as by means of the screws 68—69.

The switch 41 is shown to have four operating positions, which have been identified by the angularly spaced axes 70—71—72—73 for the actuating knob 74. The knob 74 is shown to carry a contact arm 75 which is electrically tied to the cable 64, and it will be recalled that the cable 64 is attached to the central bus bar 57 and, hence, directly to the inlet prong 42. Cables 65—66 are shown connected to contact members 76—77 which are preferably positioned between the axes 71—72 and 72—73, respectively.

In operation, it will be seen that in a first position of switch 41, say, with knob 74 on the axis 70 as shown, no contact is made between the contact arm 75 and either of the contacts 76—77. If the switch 74 is shifted to the axis 71, connection will be made between cable 64 and cable 65 through contact 76, and in such event it will be clear that full line voltage will be impressed across the outlet contact fingers 48—48' of the left-hand socket (i. e. left-hand in the sense of Figs. 6 and 7). Thus, if say a radio were plugged in the left-hand socket 44—44', such radio would not be operated when knob 74 is on the axis 70, but it could be operated with knob 74 on the axis 71.

With a further shift of the knob 74, say to the axis 72, contact arm 75 will touch both contacts 76—77 to complete circuits through cables 65—66 to both the left-hand and the right-hand sockets of the adapter 40. Thus, if a lamp were plugged into the right-hand outlet openings 46—46', with a radio plugged as before into the left-hand socket, such lamp would be operated concurrently with the radio as long as the knob 74 is positioned on axis 72. Further shifting of the knob 74 to the axis 73 would have the effect of breaking the circuit to the radio and of holding line-voltage connections to the lamp.

It will be clear that an adapter such as the adapter 40 connected to a switch 41 may provide for independent or concurrent use of a plurality of appliances plugged into the adapter. In the form shown, the central socket is constantly alive, so that an electric clock plugged through the socket openings 45—45' will not be affected for any position of the control knob 74.

In Fig. 8 I show a modification of the arrangement of Fig. 7 whereby a multi-facet adapter, such as the adapter 10 of Fig. 2, may be made to perform the functions of the adapter 40 of Fig. 6. In such a modification, it will be clear that one side of the line may be constantly applied to socket openings on all facets, as by the assembly 14 of Fig. 3. In providing connections to the other side of the line a first member 80 may include a projecting end to serve as an inlet plug element or part and a contact-finger end 81 to be positioned opposite a socket opening, such as the socket opening 31 (Fig. 3). A second member 82 may include another contact finger 83 to be positioned opposite another socket opening, and a third member 84 may include a contact finger 85 to be positioned opposite a third socket opening. Each of the members 80—82—84 is preferably insulated from the other, as by fiber washers 86, and may be separately connected to the cables 64—65—66 of the combination of Fig. 6. The members 80—82—84, together with the bushings 86, may be united in a single assembly, as by means of a rivet 87 and a further insulated bushing 88 passing through said members. When so assembled it will be clear that an adapter 10 may be made to perform the functions of the adapter 40 and still be very readily assembled.

It will be appreciated that I have described relatively simple remote-control mechanisms for particular application to household appliances. The device may be adapted to one or to a plurality of appliances, and the remote control of these appliances may be selective.

In the particular applications described, a radio and a lamp may be switched on and off separately or concurrently. If desired, these operations may be performed without interrupting the supply of current to a continuously running clock or other appliance which may also be plugged into my adapter. Importantly, it will be noted that all switch operations may be made with an absolute minimum of disturbance to the individual.

Although I have described my invention as being particularly applicable to the case of bedside appliances remotely operated from the bed, it will be appreciated that other equally useful applications are possible. For example, my device simplifies the control of Christmas tree lights by eliminating the need to reach in among delicate ornaments or to crouch behind furniture in removing a plug from a wall outlet.

While I have described my invention in detail for the preferred forms shown, it will be understood that modifications may be made within the scope of the invention as defined in the appended claims.

I claim:

1. In an adapter of the character indicated, first conducting means including a plug projection and a plurality of socket contact parts electrically connected to each other and to said plug projection, and second conducting means including a projecting plug element and a plurality of socket-contact elements, at least three of said elements being electrically insulated from each other, whereby there may be independent remotely controlled operation of a plurality of outlet circuits of said adapter.

2. An adapter according to claim 1, in which said plug element is electrically connected to one of said socket-contact elements, whereby at least two outlet circuits of said adapter may be independently and remotely controlled while a third outlet circuit may not be subject to such control.

3. In a device of the character indicated, an adapter including a housing, first conducting means including an externally projecting portion to form one member of a power-inlet plug, said first conducting means also including a first plurality of electrically connected resilient fingers positioned to be engaged by prongs of further plugs inserted in said adapter, second conducting means including an externally projecting portion to form a second member of the power-inlet plug, said second conducting means also including a second plurality of resilient fingers to be engaged by the further plugs inserted in said adapter, a flexible cable having three conductors, one of said conductors being electrically connected to one finger of said second plurality, a second of said conductors being electrically connected to a second finger of said second plurality, the third of said conductors being electrically connected to the projecting portion of said second conducting means, and a switch including contact means electrically connected to said third conductor and selectably positionable to contact said first and said second conductors.

4. In a device of the character indicated for selectively and collectively closing and opening a plurality of circuits, an adapter including power-inlet means and power-outlet means for each of said plurality of circuits, and a single switching means including a manually operable member connected to said adapter by flexible means, said switching means and said adapter having means for selectively closing either of two of said circuits and for closing both of said two circuits, whereby by remote control of said switching means appliances such as a lamp and a radio may be alternately and concurrently operated.

5. In a device of the character indicated for selectively and collectively closing and opening a plurality of circuits, an adapter including power-inlet means and power-outlet means for each of said plurality of circuits, and switching means including a manually operable member connected to said adapter by flexible means, said switching means and said adapter having means for selectively closing one of said circuits independently of another of said circuits, whereby an appliance such as a lamp or a radio may be selectably operated by remote-controlled switch.

6. In a device of the character indicated, an adapter including power-inlet means and a plurality of power outlets, one of said power outlets being permanently electrically connected to said power-inlet means, and switching means including a manually operable member connected to said adapter by flexible means and electrically interposed between said power-inlet means and another of said power outlets, whereby there may be remotely controlled operation of one of said power outlets without affecting continuous through operation of another power outlet.

7. A device according to claim 6, in which said switching means includes means selectably controlling a plurality of circuits, and in which said switching means is interposed between said power-inlet means and a corresponding plurality of said power outlets, whereby each of said plurality of power outlets may be selectably controlled by said switching means while said one power outlet may remain undistributed by any possible operation of said switching means.

ROY C. HOPGOOD.

REFERENCES CITED

The following references are of record in the file of this patent:

UNITED STATES PATENTS

| Number | Name | Date |
|---|---|---|
| 1,303,464 | Davis | May 13, 1919 |
| 1,941,488 | Propp | Jan. 2, 1934 |
| 2,098,771 | Bogue | Nov. 9, 1937 |
| 2,234,876 | Rehrer | Mar. 11, 1941 |

FOREIGN PATENTS

| Number | Country | Date |
|---|---|---|
| 400,032 | Great Britain | Oct. 19, 1933 |
| 420,227 | Great Britain | Nov. 16, 1934 |